(12) United States Patent
Van Dam et al.

(10) Patent No.: US 8,618,708 B2
(45) Date of Patent: Dec. 31, 2013

(54) ELECTRICAL MACHINE

(75) Inventors: Jeremy Daniel Van Dam, West Coxsackie, NY (US); James Pellegrino Alexander, Ballston Lake, NY (US); Murtuza Yusuf Lokhandwalla, Canton, MI (US)

(73) Assignee: General Electric Company, Niskayuna, NY (US)

( * ) Notice: Subject to any disclaimer, the term of this patent is extended or adjusted under 35 U.S.C. 154(b) by 180 days.

(21) Appl. No.: 13/194,047

(22) Filed: Jul. 29, 2011

(65) Prior Publication Data
US 2013/0026871 A1 Jan. 31, 2013

(51) Int. Cl.
*H02K 1/27* (2006.01)
*H02K 1/28* (2006.01)

(52) U.S. Cl.
USPC ............ 310/156.53; 310/156.56; 310/156.57; 310/156.58

(58) Field of Classification Search
USPC .............. 310/156.53, 156.56, 156.57, 156.58
See application file for complete search history.

(56) References Cited

U.S. PATENT DOCUMENTS

| | | | |
|---|---|---|---|
| 6,703,746 B2 | 3/2004 | Biais et al. | |
| 6,741,002 B2* | 5/2004 | Nishiyama et al. | 310/156.53 |
| 7,028,386 B2 | 4/2006 | Kato et al. | |
| 7,327,062 B2* | 2/2008 | Kaneko | 310/156.57 |
| 7,425,786 B2* | 9/2008 | Hino et al. | 310/156.57 |
| 7,550,889 B2* | 6/2009 | Horst | 310/156.57 |
| 7,705,503 B2* | 4/2010 | Takahashi et al. | 310/156.53 |
| 7,750,523 B2* | 7/2010 | Nakayama et al. | 310/156.53 |
| 2003/0201685 A1* | 10/2003 | Shimada et al. | 310/156.53 |
| 2006/0071568 A1* | 4/2006 | Kimura et al. | 310/156.56 |
| 2006/0119203 A1 | 6/2006 | Brown et al. | |
| 2007/0103024 A1* | 5/2007 | Nakayama et al. | 310/156.53 |
| 2007/0252468 A1* | 11/2007 | Lee | 310/156.53 |
| 2007/0290566 A1* | 12/2007 | Mizutani et al. | 310/156.56 |
| 2008/0224558 A1* | 9/2008 | Ionel | 310/156.57 |
| 2009/0102306 A1* | 4/2009 | Nishijima | 310/156.53 |
| 2010/0127584 A1* | 5/2010 | Gottfried | 310/61 |
| 2010/0259123 A1* | 10/2010 | Nishijima | 310/156.53 |

FOREIGN PATENT DOCUMENTS

| | | | | | |
|---|---|---|---|---|---|
| JP | 54075004 A | * | 6/1979 | | H02K 1/30 |
| JP | 05292691 A | * | 11/1993 | | H02K 1/32 |
| JP | 7-11859 U | * | 2/1995 | | H02K 1/27 |
| JP | 09200988 A | * | 7/1997 | | H02K 1/32 |
| JP | 2005253162 A | * | 9/2005 | | H02K 1/30 |
| WO | 2004006412 A2 | | 1/2004 | | |

OTHER PUBLICATIONS

Translation of foreign document JP 7-11859 U.*
Munehiro Kamiya; Development of Traction Drive Motors for the Toyota Hybrid System; Toyota Motor Corporation, 1, Toyota-cho, Toyota, Aichi, 471-8571 Japan; 8 Pages.

* cited by examiner

*Primary Examiner* — Tran Nguyen
*Assistant Examiner* — Alex W Mok
(74) *Attorney, Agent, or Firm* — Jason K. Klindtworth

(57) ABSTRACT

In one embodiment, an apparatus includes a rotor shaft, at least one pole segment, at least one pole tip segment and at least one permanent magnet pair. The at least one pole segment is mechanically coupled to the rotor shaft. Each permanent magnet pair is disposed between the at least one pole segment and respective pole tip segment. The apparatus further includes at least one mechanical member that mechanically restrains the at least one pole tip segment to at least one of the rotor shaft or the at least one pole segment.

12 Claims, 6 Drawing Sheets

ELECTRICAL MACHINE

STATEMENT REGARDING FEDERALLY SPONSORED RESEARCH & DEVELOPMENT

This invention was made with Government support under contract number DE-FC26-07NT43122 awarded by U.S. Department of Energy. The Government has certain rights in the invention.

BACKGROUND

Embodiments presented herein relate generally to a field of electrical machines and, more particularly, to an interior permanent magnet (IPM) rotor of the electrical machines.

An IPM machine (a type of "electrical machine") is known for its high drive efficiency. Because of the efficiency, the IPM machine has been extensively used as a most common motor type in hybrid electric automobiles. The usage of this electrical machine has increased significantly over years.

The electrical machine comprises a stator and an IPM rotor. The rotor includes embedded permanent magnets. These magnets are restrained to rotor body against centrifugal forces using bridges or webs of the rotor body material. These webs and/or bridges provide structural strength to the rotor. Typically, these webs and bridges are made of magnetically conductive materials.

Efficiency and power delivery of this electrical machine is based on amount of flux transferred between the rotor and the stator. Leakage of flux around the magnets within the rotor limits the efficiency and power density of the motor by decreasing the flux transfer between the rotor and stator. The webs and/or bridges that provide structural support provide leakage paths for flux.

Known techniques discuss flux leakage reduction by means of reducing cross section area of webs and/or bridges. The flux leakage in these techniques is limited by maximum flux density that can be carried by the webs and/or bridges known as saturation flux density. Other techniques discuss flux leakage reduction by introduction of geometric irregularities, such as holes or slots in the webs and/or bridges. In this case, the total flux leakage would still be governed by the ability to limit the size of the magnetically conductive webs or bridges. In both the cases, the strength of webs and/or bridges that provide structural support and strength is reduced. Moreover, reduction in structural support increases mechanical stress in the webs and/or bridges during operation of the rotor. In order to maintain mechanical integrity in operation, webs and/or bridges of sufficient size and strength need to be provided to limit the mechanical stress. However, providing webs and/or bridges of sufficient strength and size causes an increase in the leakage of flux. This flux leakage significantly reduces the machine power density, and the machine efficiency.

Therefore, there is a need for reducing the flux leakage in the rotor without compromising structural integrity of the rotor assembly.

BRIEF DESCRIPTION

The above and other drawbacks/deficiencies may be overcome or alleviated by embodiments presented herein.

According to one embodiment, an apparatus includes at least one pole segment, at least one pole tip segment, and at least one permanent magnet pair. Each permanent magnet pair is disposed between the at least one pole segment and the at least one pole tip segment. The apparatus also includes at least one mechanical member that mechanically restrains the at least one pole tip segment to the at least one pole segment.

According to another embodiment, an apparatus includes at least one pole segment, at least one permanent magnet pair and at least one mechanical member. The at least one permanent magnet pair is embedded within the at least one pole segment. The at least one mechanical member mechanically restrains the at least one permanent magnet pair within the at least one pole segment.

According to yet another embodiment, an apparatus includes a stator and a rotor. The rotor is electromagnetically coupled to the stator. The rotor includes at least one pole segment coupled to the rotor shaft, at least one pole tip segment, at least one permanent magnet pair, and at least one mechanical member. Each permanent magnet pair is disposed between the at least one pole segment and respective pole tip segment. The at least one mechanical member mechanically restrains the at least one pole tip segment within the rotor shaft or the at least one pole segment.

DRAWINGS

These and other features, aspects, and advantages of the present system and techniques will become better understood when the following detailed description is read with reference to the accompanying drawings in which like characters represent like parts throughout the drawings, wherein.

DETAILED DESCRIPTION

Various embodiments presented herein describe an electrical machine. The electrical machine includes, inter alia, a stator and an apparatus such as an IPM rotor electromagnetically coupled to the stator. Examples of the electrical machine include, but are not limited to a motor and a generator. The rotor, according to embodiments as described herein, may be designed to reduce intra-pole and inter-pole magnetic flux leakages. In accordance with various embodiments, the design may eliminate the need for the webs and/or the bridges to provide structural support and strength to the rotor. In one embodiment, the electrical machine as illustrated herein is suited for high speed operations in automotive applications. However, a person skilled in the art will appreciate that various embodiments may also be deployed for other applications as well. Examples of other applications include devices for power delivery, transmission, or generation in aerospace, marine, turbo-machinery, and nuclear industries.

Figure 1:
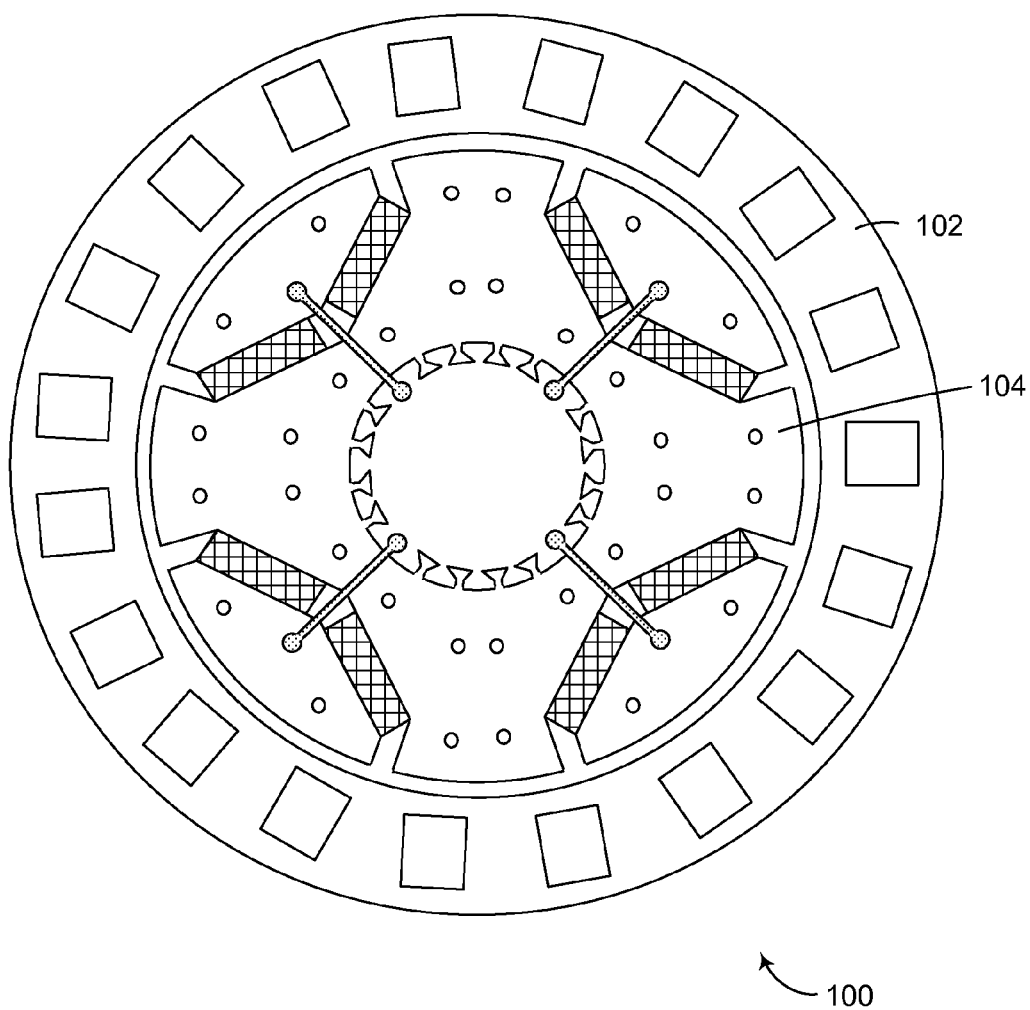
FIG. 1 is a cross sectional view illustrating an electrical machine, according to one embodiment.

An example implementation of a rotor within a stator is illustrated in FIG. 1. FIG. 1 is a cross section view illustrating the electrical machine 100, according to one embodiment. Electrical machine 100 includes a stator 102 and an IPM rotor 104. Stator 102 includes a bore to receive IPM rotor 104. IPM rotor 104 is disposed in the bore of stator 102 and is electromagnetically coupled to stator 102.

Stator 102 is configured with stator windings to generate a stator magnetic field when excited with alternating currents and extends along a radial axis. The magnetic field generated by IPM rotor 104 interacts with the stator magnetic field to produce a torque.

Figure 2:
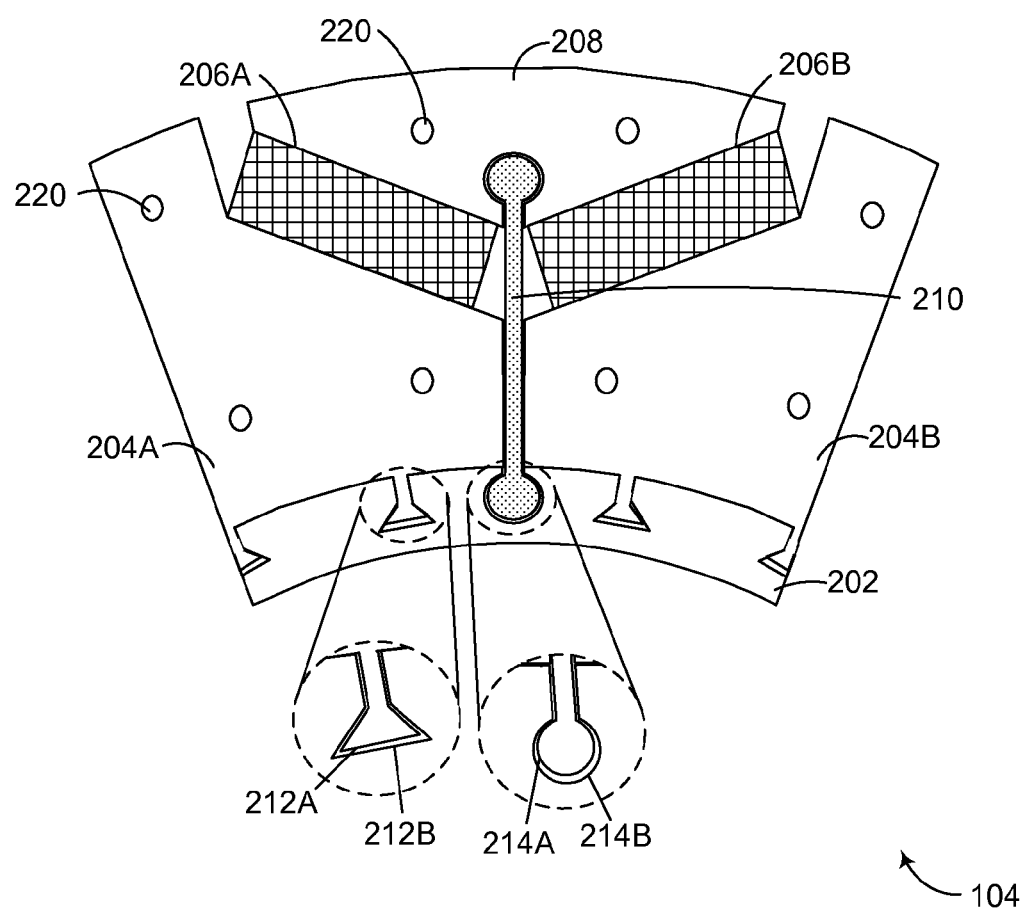
FIG. 2 is a partial cross sectional view of an IPM rotor, according to one embodiment.

FIG. 2 illustrates a partial cross sectional view of IPM rotor 104, according to one embodiment. In FIG. 2, the section represents one pole of rotor 104. As shown in the example implementation, IPM rotor 104 includes a rotor shaft 202, at least one pole segment 204A-B, at least one permanent magnet pair, such as a permanent magnet pair 206A-B, at least one pole tip segment 208, and at least one mechanical member 210. Permanent magnet pair 206A-B may include permanent magnets 206A and 206B.

Rotor shaft 202 may be made of an alloy, for example, carbon steel. The rotor shaft is a component rotatable about an axis. In one embodiment, rotor shaft 202 includes a first mechanical feature such as slots 212B to receive pole segments 204A-B. FIG. 2 illustrates one example implementation of the first mechanical feature using dovetail slots 212B. Dovetail slots 212B may be implemented on circumferential surface of rotor shaft 202 extending along an axial direction. Dovetail slots 212B are designed to restrain pole segments 204A-B to rotor shaft 202. Pole segments 204A-B are coupled to rotor shaft 202 via dovetail slots 212B. Each of pole segments 204A-B may include at least one coupling pin 212A on a side facing rotor shaft 202. Coupling pins 212A are designed to complement corresponding slots 212B on rotor shaft 202. Pole segments 204A-B are mechanically coupled to rotor shaft 202 through coupling pins 212A coupled to dovetail slots 212B. Aforementioned coupling forms a joint that restrains pole segments 204A-B to rotor shaft 202. Further, dovetail slots 212B may or may not be pre-loaded. In the example implementation, dovetail slots 212B have trapezoidal shape. In another implementation, dovetail slot 212B may also be designed in other shapes, such as, rectangular, circular, triangular, and the like. Although the embodiments describe the first mechanical feature implemented on rotor shaft 202, one skilled in the art can appreciate that the first mechanical feature can be implemented on pole segments 204A-B with rotor shaft 202 designed to include one or more coupling pins complementing the first mechanical features on the pole segments 204A-B.

In one embodiment, mechanical member 210 is used to restrain pole tip segment 208 to rotor shaft 202. Mechanical member 210 may include coupling pins 214A on opposite sides, designed to be coupled with mechanical features on rotor shaft 202 and pole tip segments 208. In one example embodiment, as illustrated in FIG. 2, mechanical member 210 is a tie bar extending axially with uniform cross-sectional shape, having keyhole coupling pins 214A on both ends. In another implementation, keyhole coupling pins 214A may also be designed in other shapes, such as, rectangular, dovetail, triangular, and the like. Other examples of mechanical member include, but are not limited to, one or more bars, screws, rivets, bolts, and the like. As illustrated in FIG. 2, mechanical member 210 is coupled to rotor shaft 202 and pole tip segment 208 through coupling pins 214A and is disposed between pole segments 204A-B through a slot provided therefor. Rotor shaft 202 includes one or more second mechanical features designed to receive the coupling pin on mechanical member 210 at the end facing rotor shaft 202. FIG. 2 illustrates one example implementation of the one or more second mechanical features using keyhole slots 214B. Keyhole slots 214B are implemented on the circumferential surface extending axially on rotor shaft 202. Similarly, pole tip segment 208 also includes the one or more second mechanical features that are designed to receive the coupling pin on mechanical member 210 at the end facing pole tip segment 208. An implementation of the second mechanical feature in a form of keyhole slot 214B at one side of the pole tip segment 208 facing permanent magnet pair 106 is illustrated in FIG. 2. While, the coupling pins are shown to be of similar type, it need not be so and a mechanical member may be design to have different types of coupling pins on opposite ends. In this case, the one or more mechanical features on the rotor shaft and the pole tip segment designed to receive the coupling pins will also be of different types. Although the aforementioned embodiments describe the second mechanical features implemented on rotor shaft 202 and pole tip segment 208, one skilled in the art can appreciate that the second mechanical feature can be implemented on mechanical member 210, with rotor shaft 202 and pole tip segment 208 designed to include coupling pins complementing the second mechanical feature on mechanical member 210.

Permanent magnet pair 206 is disposed and mechanically restrained between pole tip segment 208 and pole segments 204A-B forming a geometric arrangement. Geometric arrangement is formed by designing pole segments 204A-B and pole tip segment 208 appropriately, an example of which is illustrated in FIG. 2. In one embodiment, pole segments 204A-B are coupled so as to form a vee-shaped surface extending axially outward as illustrated in FIG. 2. In one embodiment, the vee-shaped surface may be designed for orienting permanent magnet pair 206 to optimize flux distribution. In an alternate embodiment, the surface may be designed to be arc-shaped to accept curved magnets. A person skilled in the art will recognize other suitable surface structures may be formed by the plurality of pole segments.

When pole tip segment 208 is restrained to rotor shaft 202 through mechanical member 210, the geometric arrangement mechanically restrains permanent magnet pair 206 disposed between pole tip segment 208 and pole segments 204A-B within IPM rotor 104 assembly. In a non-limiting example, the permanent magnet pair 206 may be made of a neodymium-boron-iron, samarium-cobalt, ferrite, or Alnico and the like.

In one embodiment, pole segments 204A-B and pole tip segment 208 are made of a magnetically conductive material such as ferromagnetic materials with relative a permeability greater than 10 and preferably greater than 100. Examples of magnetically conductive materials include, but are not limited to, carbon steel or steel made of silicon-iron, cobalt-iron, or nickel-iron.

Mechanical members 210, according to one embodiment, are made of material having substantially low magnetic conductivity with relative permeability value in range between 1 and 10 to prevent flux leakages between permanent magnet pair 206. Examples of such a material include, but are not limited to, a 300 series stainless steel, titanium alloys, and austenitic nickel-chromium-based superalloys, such as the alloys commonly associated with the trade name INCONEL registered to Special Metals Corporation (New Hartford, N.Y.). According to one embodiment, the material may be selected such that magnetic permeability of the material is at least 100 times less than magnetic permeability of materials used to make the pole segments and/or pole tip segments. Pole segments 204A-B conduct magnetic flux between rotor poles.

Also, as illustrated in FIG. 2, gaps between pole segments 204A-B and pole tip segments 208 near circumferential surface of IPM rotor 104 assembly prevent flux leakage. This is because air within the gap has a relatively low permeability compared to the permeability of the pole tip and pole segment materials. As a result, flux leakage is significantly reduced.

In the current example implementation, the first mechanical feature is designed as a keyhole slot and the second mechanical feature is designed as a dovetail slot. In alternative embodiments, other types of slots, such as T-shaped slots, circular or oblong keyholes, may also be used to implement the first and the second mechanical features. In various other embodiments, any types of slot may be used to implement the first and the second mechanical features. Correspondingly, mating connectors appropriate for the type of slot may be provided to complement the slot resulting in a mechanical interlock.

IPM rotor 104 may include additional mechanical features and additional mechanical members 220. Additional mechanical features may, for example, be a set of axial grooves. Additional mechanical members 220 may be a set of rivets. In one embodiment, additional mechanical members 220 may be made of a substantively magnetically non-conducting material. As illustrated in FIG. 2, a set of rivets 220 may be provided in pole segments 204A-B, or pole tip segment 208, or both. Non-magnetic rivets 220 may be inserted through corresponding grooves and coupled to a support structure (not shown) disposed at discrete locations along a length IPM rotor 104. Aforementioned additional support may provide more strength to IPM rotor 104. Although rivets are described as additional mechanical members, one skilled in the art can appreciate that other suitable members, such as, screws, bolts, rods, and the like can be used to provide the additional mechanical strength.

Although IPM rotor 104 is described herein as an assembly of individual components, a person skilled in the art can appreciate that the individual component may be produced as a unit with non-functional linkages. As an example, the functions of the pole segment 204 and shaft 204 can be combined and produced as a single part. Furthermore, the placement of one or more mechanical members 220 may be selected for maximum benefit. As an example, mechanical members 220 can be used at any location within a one-piece pole segment to provide mechanical support without increasing flux leakage.

Figure 3:
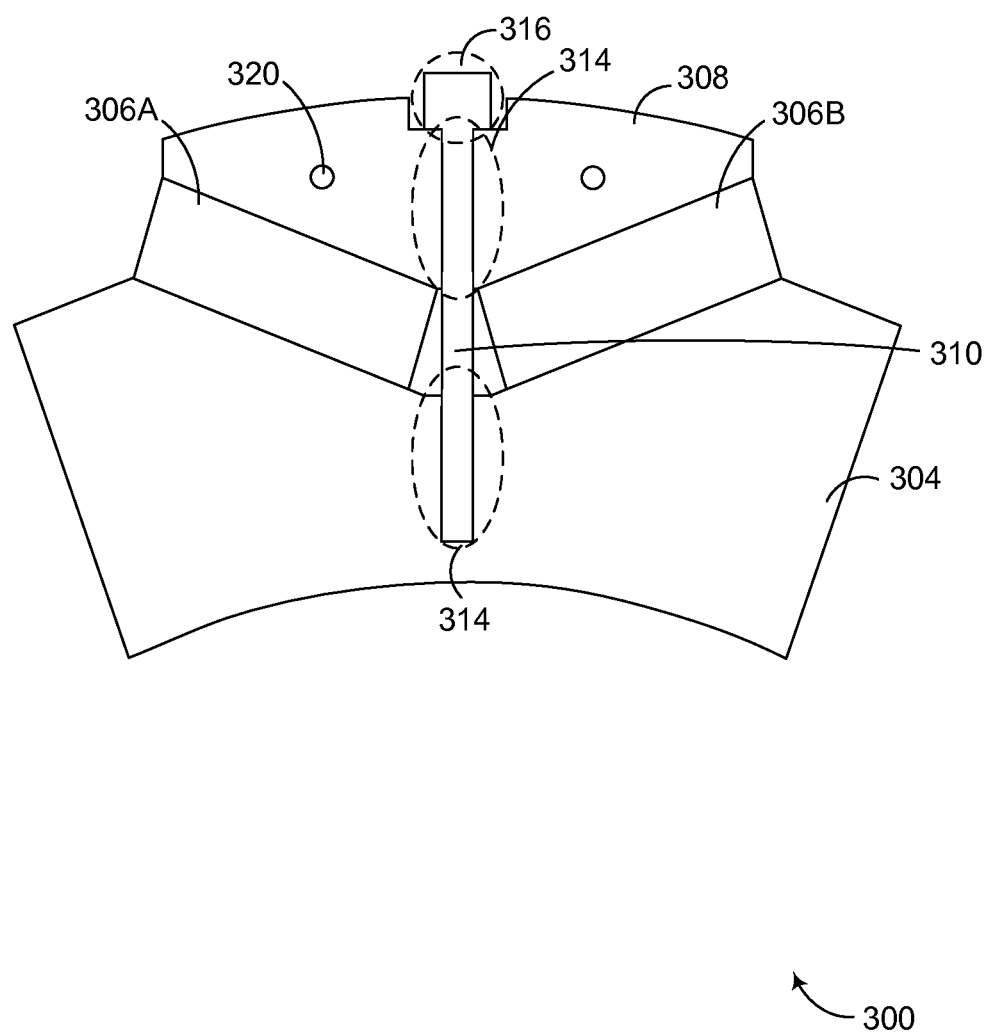
FIG. 3 is a partial cross sectional view of the IPM rotor, according to another embodiment.

FIG. 3 is a partial cross sectional view illustrating a section of a rotor 300, according to another embodiment. Rotor 300 includes a pole segment 304, at least one permanent magnet pair 306, at least one pole tip segment 308, and at least one mechanical member, for example, a span bolt 310 with a bolt head 316. Each permanent magnet pair 306 may include permanent magnets 306A and 306B. In this example implementation, rotor 300 includes only one pole segment 304. In the current example, pole segment 304 functions as a rotor shaft. In an alternate embodiment, there may be a rotor shaft on which pole segment 304 is mounted and coupled. In such a case, the coupling may be substantially similar to coupling as described in FIG. 2. Alternatively, any other known techniques may also be used for coupling pole segment 304 to the rotor shaft.

In the current embodiment, pole segment 304 includes a vee-shaped surface extending axially on an external side, as illustrated in FIG. 3. In one embodiment, vee-shaped surface is designed to receive permanent magnet pair 306 at an orientation that is optimal for flux distribution. Permanent magnet pair 306 is placed in vee-shaped surface and coupled to pole segment 304. Pole tip segment 308 is mounted on permanent magnet pair 306 disposed in vee-shaped surface.

Pole tip segment 308 mounted on permanent magnet pair 306 is coupled and restrained to pole segment 304 by a mechanical member. In one embodiment, the mechanical member used herein is span bolt 310 with bolt head 316. Span bolt 310 is passed through a third mechanical feature 314 of pole tip segment 308 and pole segment 304 and coupled to pole segment 304. In one embodiment, span bolt 310 may be made of a magnetically non-conductive material. In various embodiments, the mechanical member may be a screw, a bar, a rivet and the like; and pole segment 304 and pole tip segments 308 may include corresponding mechanical features that receive the mechanical member.

Pole segment 304 includes the third mechanical feature to receive span bolt 310. In the current embodiment, the third mechanical feature is a radial hole 314 through the pole segment 304. FIG. 3 illustrates one example implementation of the third mechanical feature using radial hole 314 that may be threaded. Pole tip segment 308 also includes the third mechanical feature to receive the mechanical member. In the current embodiment, the third mechanical feature in pole tip segment 308 includes radial hole 314.

Permanent magnet pair 306 is disposed within a geometric arrangement formed by pole segment 304 and pole tip segment 308 as illustrated in FIG. 3. The design of pole segment 304 and the design of pole tip segment 308 complementing the orientation of pole segment 304 form the geometric arrangement. Permanent magnet pair 306 is restrained within the geometric arrangement when pole tip segment 308 is restrained to pole segment 304 through span bolt 310. The aforementioned configuration restrain an assembly comprising permanent magnet pair 306 and pole tip segment 308, to pole segment 304 through span bolt 310.

Rotor 300 may further include rivets 320. Rivets 320 provide additional mechanical strength to rotor 300. In one embodiment, rivets 320 may be magnetically non-conductive and electrically isolated from pole tip segment 308. A person skilled in the art will appreciate that other structures such as bolts, screws and the like may be used as additional mechanical members instead of or in addition to rivets to provide the additional mechanical strength.

The example embodiment of FIG. 3 describes a configuration where span bolt 310 is coupled to pole segment 304, restraining pole tip segment 308 and permanent magnet pair 306 to pole segment 304. In an example case, where pole segment 304 is mounted on a rotor shaft, span bolt 310 may extend from pole tip segment 308 to the rotor shaft through pole segment 304 such that span bolt 310 restrains pole tip segment 308 and permanent magnet pair 306 to the rotor shaft.

Figure 4:
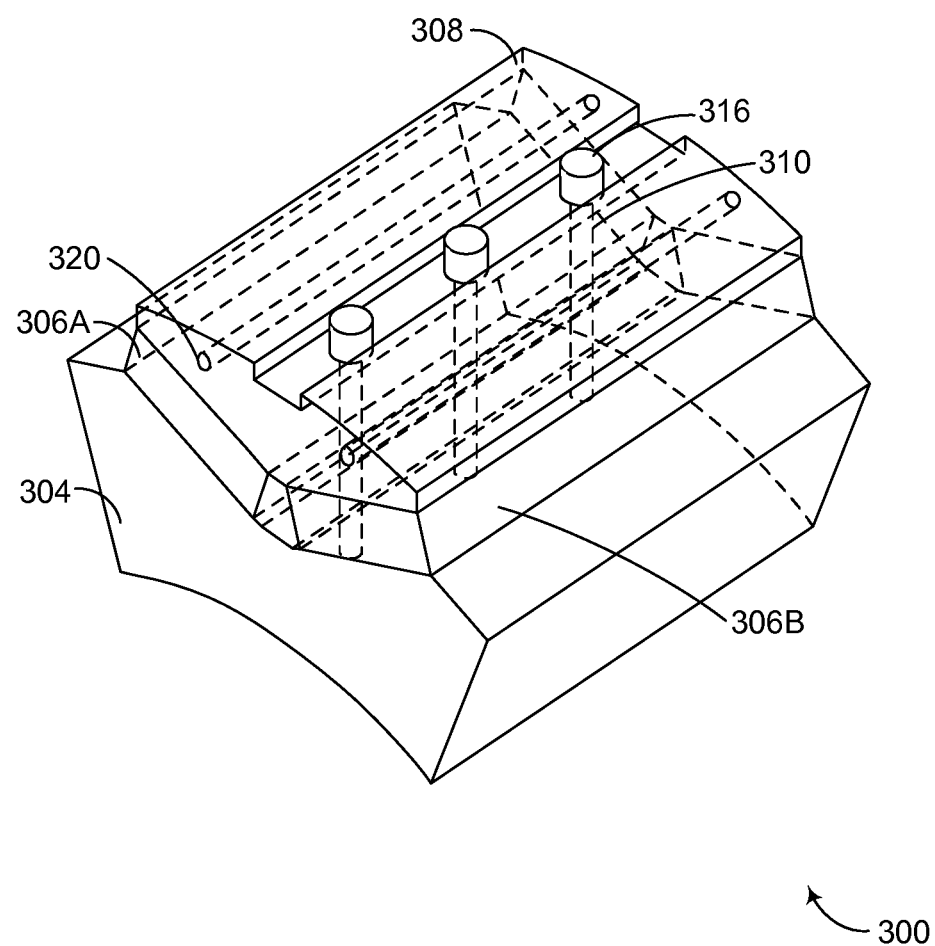
FIG. 4 is a partial cross sectional view illustrating a three dimension construct of the IPM rotor illustrated in FIG. 3, according to one embodiment.

A three dimensional construct of a section of IPM rotor 300 is illustrated in FIG. 4. As illustrated in FIG. 4, pole segment 304 and pole tip segment 308 include a row of threaded holes (the third mechanical features) with a specific pitch between consecutive holes. Span bolts 310 may be inserted through corresponding holes and coupled to pole segment 304.

Figure 5:
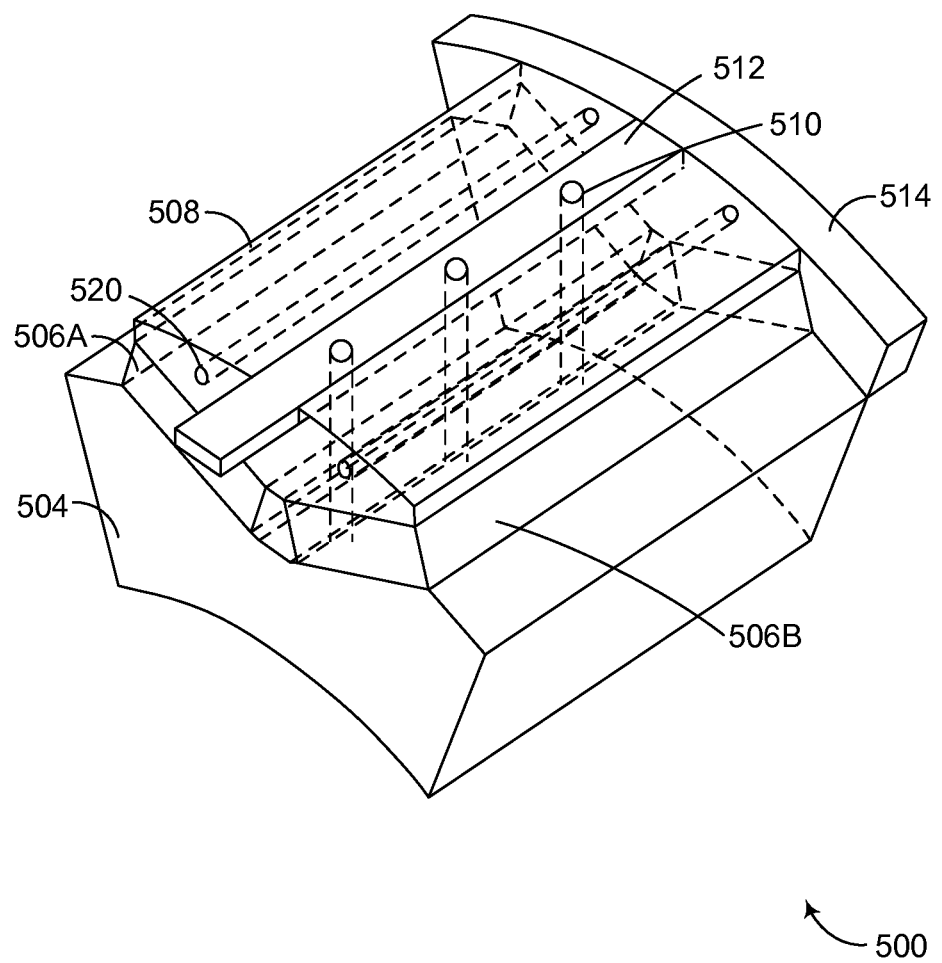
FIG. 5 is a partial cross sectional view of the IPM rotor, according to yet another embodiment.

FIG. 5 is a perspective view of a section of an IPM rotor 500, according to an alternate embodiment. In the current embodiment, IPM rotor 500 includes a pole segment 504, at least one permanent magnet pair 506 including permanent magnets 506A and 506B, at least one pole tip segment 508, at least one mechanical member 510 and at least one support bar 512. The design and construction of rotor 500, according to the current embodiment may be substantially similar to rotor 300 described in embodiments of FIG. 3 and FIG. 4. In the current embodiment, however, bolt heads 316 are replaced by support bars 512.

In this example implementation, support bars 512 are coupled perpendicularly and circumferentially to a support disc 514. Support disc 514 may be disposed axially along the length of rotor 500. Rotor 500 may be provided with additional support members 520 to provide additional support.

Additional support members 520 may be substantially similar to additional support member 220 and 320 as illustrated in FIGS. 2 and 3, respectively.

Figure 6:
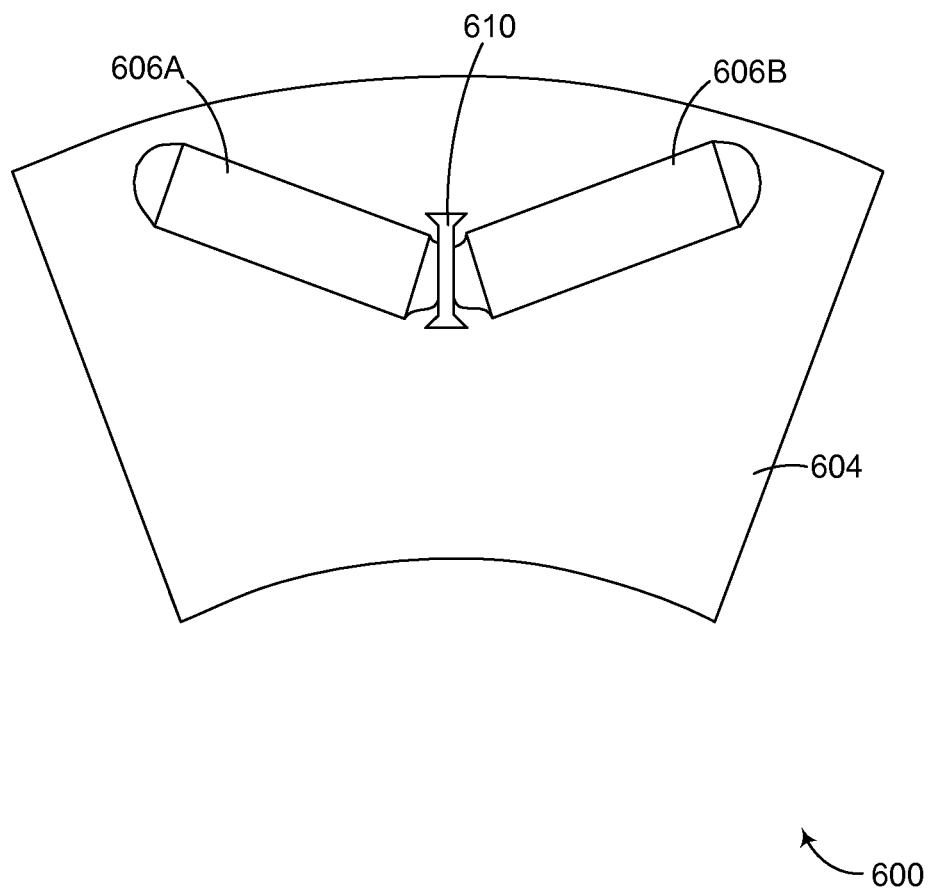
FIG. 6 is a partial cross sectional view of the IPM rotor, according to a further embodiment.

FIG. 6 is a partial cross sectional view illustrating a section of a rotor 600, according to a further embodiment. Rotor 600 includes a pole segment 604, at least one permanent magnet pair, and at least one mechanical member 610. Each permanent magnet pair 606 may include permanent magnets 606A and 606B. In current example, permanent magnet pairs 606 are embedded within pole segment 604. In one embodiment, permanent magnet pair 606 may be embedded in an orientation to optimize flux distribution.

Mechanical member 610 restrains permanent magnet pair 606 embedded within pole segment 604. According to the current embodiment, mechanical member 610 is a tie bar extending axially and having dovetail pins on opposite ends. The dovetail pins could be square, rectangular, round and the like. Mechanical member 610 is disposed in a mechanical feature. The mechanical feature may be a groove extending axially. Pole segment 604 includes the mechanical feature to receive mechanical member 610. In the current embodiment, mechanical feature 614 is a tie bar slot designed to receive mechanical element 610. The position of mechanical member 610 and mechanical feature 614 is such that permanent magnet pair 606 is structurally supported within rotor 600 assembly. A person skilled in the art will appreciate other mechanical members that may be used instead of or in addition to tie bar 610 to support the permanent magnet pairs.

In the current embodiment, mechanical element 610 is made of a material having substantially low magnetic conductivity. Examples of such material include, but are not limited to, a 300 series stainless steel, titanium alloys and austenitic nickel-chromium-based superalloys, such as the alloys commonly associated with the trade name INCONEL registered to Special Metals Corporation (New Hartford, N.Y.). Non-magnetic mechanical element 610 located between permanent magnet pair 606 reduces the flux leakage between permanent magnet pair 606.

Any of above mentioned designs may be implemented as a rotor and used in an electrical machine employing a stator. Examples of electrical machine include, but are not limited to a motor and a generator. The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. An apparatus comprising:
   at least one pole segment;
   at least one pole tip segment;
   at least one permanent magnet pair, each permanent magnet pair being disposed between the at least one pole segment and the at least one pole tip segment; and
   at least one mechanical member that mechanically restrains the at least one pole tip segment to at least one pole segment.

2. The apparatus of claim 1, wherein the at least one pole tip segment and the at least one pole segment comprise one or more third mechanical features that receive the at least one mechanical member.

3. The apparatus of claim 1, further comprising a rotor shaft, wherein the at least one pole segment is coupled to the rotor shaft, wherein the at least one mechanical member mechanically restrains the at least one pole tip segment to the rotor shaft, and wherein the at least one pole tip segment and the rotor shaft comprise one or more second mechanical features that receive the at least one mechanical member.

4. The apparatus of claim 3, wherein the at least one pole segment comprises a plurality of pole segments, wherein each pole segment is restrained to the rotor shaft separately.

5. The apparatus of claim 3, wherein at least one of the rotor shaft and the at least one pole segment comprises one or more first mechanical features that mechanically restrain the at least one pole segment to the rotor shaft.

6. The apparatus of claim 5, wherein the one or more first mechanical features comprises one of keyhole slots, dovetail slots, or T-shaped slots.

7. The apparatus of claim 1, wherein the at least one mechanical member is comprised of a material having substantially low magnetic conductivity.

8. The apparatus of claim 7, wherein the material comprises one of a 300 series stainless steel, Titanium alloy, or austenitic nickel-chromium-based superalloys.

9. The apparatus of claim 1, wherein each permanent magnet pair is mechanically restrained by a geometric arrangement.

10. The apparatus of claim 1, wherein the at least one mechanical member comprises one of a tie-bar, a screw, a rivet, a bar or a span bolt.

11. The apparatus of claim 1, wherein the apparatus is configured to be disposed in a bore of a stator and to be electromagnetically coupled to the stator.

12. An apparatus comprising:
    a stator;
    a rotor electromagnetically coupled to the stator, the rotor comprising:
       at least one pole segment coupled to a rotor shaft;
       at least one pole tip segment;
       at least one permanent magnet pair, each permanent magnet pair being disposed between the at least one pole segment and respective pole tip segment; and
       at least one mechanical member that mechanically restrains the at least one pole tip segment to a rotor shaft or the at least one pole segment.

* * * * *